United States Patent [19]
Cooke, Jr.

[11] 3,935,339
[45] Jan. 27, 1976

[54] METHOD FOR COATING PARTICULATE MATERIAL THEREOF

[75] Inventor: Claude E. Cooke, Jr., Houston, Tex.

[73] Assignee: Exxon Production Research Company, Houston, Tex.

[22] Filed: July 16, 1973

[21] Appl. No.: 379,286

[52] U.S. Cl. .............. 427/216; 427/4; 427/212; 427/221; 427/340; 427/386; 427/388
[51] Int. Cl.² ....................................... B05D 7/00
[58] Field of Search ........ 117/100 S, 100 A, 100 B, 117/100 M, 100 C, 100 D, 123 D, 119.6, 62.2, 109; 260/42.53; 106/308 M; 427/212, 216, 221, 340, 386, 388

[56] References Cited
UNITED STATES PATENTS

| | | | |
|---|---|---|---|
| 2,807,556 | 9/1957 | Stark | 117/100 S |
| 2,829,982 | 4/1958 | Hoyt | 117/100 S |
| 2,965,514 | 12/1960 | Less et al. | 117/100 S |
| 3,026,938 | 3/1962 | Huitt et al. | 117/100 S |
| 3,026,938 | 3/1962 | Huitt et al. | 117/100 S X |
| 3,492,147 | 1/1970 | Young et al. | 117/119.6 X |
| 3,539,377 | 11/1970 | Steinle | 117/100 B X |
| 3,586,654 | 6/1971 | Lerman et al. | 106/308 M |
| 3,677,804 | 7/1972 | Kalnin et al. | 117/100 S X |
| 3,706,592 | 12/1972 | Thomson | 117/100 S X |
| T908,010 | 3/1973 | Carey et al. | 117/61 X |

*Primary Examiner*—Ralph Husack
*Assistant Examiner*—Dennis C. Konopacki
*Attorney, Agent, or Firm*—Robert L. Graham

[57] ABSTRACT

A Method of coating particulate materials (such as silica sand, glass beads, seeds and metal particles) with a liquid thermosetting epoxy resin which comprises agitating the epoxy resin with the particles in a nonpolar liquid, which is immiscible with the epoxy resin, and contains a nonionic surfactant having a molecular weight of at least 2,000 to retard the tendency of the epoxy coated particles to agglomerate during curing of the resin in the non-polar liquid. A suitable liquid for use as the immiscible liquid is a paraffinic oil which is aromatic-free and olefin-free.

17 Claims, No Drawings

METHOD FOR COATING PARTICULATE MATERIAL THEREOF

BACKGROUND OF THE INVENTION

1. Field of the Invention

This invention relates to a method for coating particulate material with a thermosetting resin and the product produced by such method.

2. Background of the Invention

Resin-coated particles have been proposed for use in a wide variety of operations including molding (resin-coated sand), reinforcing of concrete or cement (resin-coated steel fibers), and oil field hydraulic fracturing (resin-coated propping agent). The present invention will be described mainly in connection with resin-coated particles employed as a propping agent in hydraulic fracturing operations; it should be understood, however, that the particles coated in accordance with the method of the present invention can be used in the operations mentioned above as well as other operations which employ free-flowing, resin-coated particulate material.

Hydraulic fracturing is a technique for stimulating the production of subterranean formations. The technique normally involves (1) injecting a viscous liquid through a well and into the formation at a sufficient rate and pressure to overcome the earth stresses and form a crack (fracture) in the formation; and (2) placing a particulate material (propping agent) in the formation to maintain the fracture in a propped condition when the injection pressure is released. The propped fracture thus provides a highly conductive channel in the formation. The degree of stimulation afforded by the hydraulic fracture treatment is largely dependent upon the permeability and the width of the propped fracture.

Although a variety of particulate materials have been proposed for use in hydraulic fracturing, silica sand remains the most common propping agent currently used. Sand, however, is not an ideal propping agent. Its relatively low compression strength and tendency to fragment greatly restrict its effectiveness at closure stresses above about 5000 psi. At higher stress levels, the fines produced by particle disintegration plug the interstices of the propped fracture, drastically reducing fracture permeability.

Efforts to develop a propping agent which exhibited improved strength and less tendency to disintegrate led to the employment of resin-coated particles. Tests have shown that permeability retention of these particles is far better than sand under the same conditions. However, techniques for coating the particles were either unsuited for preferred materials or were too expensive, with the result that resin-coated particles have not been used extensively as a proppant. The main problem associated with the coating process is that of particle agglomeration.

In one coating technique, a liquid resin is applied to a batch of particles. The coated particles are then agitated in a suitable oil bath until the resin cures. The agitation tends to prevent the particles from sticking together (agglomerating). Tests have shown, however, this technique does not work for all resins. With epoxy, for example, the particles usually cure into one large agglomerated mass. If sufficient agitation is provided to prevent agglomeration, this technique produces irregular surface coatings on the particles. These irregularities are believed to be due to the manner in which the resin-coated particles are cured. Under agitation, the coated particles collide and temporarily bond together at contact areas. Agitation however breaks the bond permitting each particle to repeatedly collide with and break away from other particles. As the resin reaches a tacky condition, the forces tending to separate two particles pull or stretch the bond holding particles together until the bond breaks. The stretched resin in the partially cured state retains its extended form leaving an irregular projection or spike on the coating surface. During the curing step, collisions and bond disruptions are constantly occurring on each particle with the result that each particle has several irregular projections. These projections are undesirable mainly because they produce thin coatings on the particle between the projections and thereby reduce the mechanical strength of the particle. Also, there is increased tendency of such particles to bridge an opening which could lead to "sand out" in hydraulic fracturing.

SUMMARY OF THE INVENTION

The purpose of the present invention is to provide an improved resincoated product and an improved method for preparing resin-coated particles which lends itself to high-volume, batch production techniques. The particles prepared by the present invention are characterized as free-flowing, non-sticking particles having hard, uniform, and smooth resin coatings. Tests have shown that these particles have compressive strength in excess of sand and do not exhibit excessive fragmentation under compressive stresses up to 10,000 psi.

Briefly, the method involves coating particulate material with a liquid thermoset resin, preferably an epoxy resin, and agitating the coated particles with a liquid immiscible with the resin and containing a surfactant capable of retarding particle agglomeration as resin cures to a solid state. The preferred surfactant is a nonionic surfactant having a molecular weight of at least 2000. The resin is applied in sufficient amounts to provide a relatively thick coating preferably constituting from about 2 to about 15 weight percent of the coated particle.

The mechanisms responsible for the improved results afforded by the present invention are not fully understood, but are believed to involve the concentration of surfactant molecules at the interface of the liquid resin (a polar liquid) and the cure liquid (a nonpolar liquid). The molecules surrounding the resin coating on each particle provide a protective barrier or film which retards the tendency of the resin to agglomerate as particles collide. Other mechanisms such as altering interfacial tension between the liquid phases may also be present.

DESCRIPTION OF THE PREFERRED EMBODIMENTS

The present invention may be employed to coat a variety of particulate materials having diverse shapes and sizes. Its preferred application as described herein, however, is in the coating of inorganic materials such as glass beads or silica sand having a mesh size between about 6 and 100 based on the U.S. Standard Sieve Series.

The improved method requires the following steps:
(1) coating a particulate substrate material with a liquid resin; (2) agitating the coated particles with a bath liquid which is immiscible with the resin and containing a suitable surfactant until the resin cures; and (3) finally, removing the particles from the bath liquid. A novel feature of the method is the use of a surfactant in the curing bath.

The selection of the particulate substrate material and resin employed in the method can be by guidelines established in the prior art. The substrate material may include silica sand, glass beads, metal pellets or fibers, organic materials such as shells or seeds, plastic pellets or fibers, or composites of these.

The liquid resin will be selected for its ability to bond to the substrate material and for its mechanical properties and cost. Preferred resins include epoxy, urea aldehyde, phenol-aldehyde, and furan resins, or other resins capable of bonding to the selected substrate material. The term "liquid resin" as used herein embraces any resin-forming mixture including resins in pure form, diluted resins, and mixtures of the resin with curing agents, coupling agents or other additives.

The type of surfactant usable will depend on the type of substrate material employed and the type of resin coating selected. Preferred surfactants are nonionics having a molecular weight greater than about 2000. The nature of the high molecular weight surfactants appears to improve the protective film between the resin and nonpolar bath liquid described previously. Surfactants which have produced satisfactory results in laboratory tests are:

1. condensates of ethylene oxide and propylene oxide with propylene glycol (MW between 2000 and 5000), commercially available from Wyandotte Chemicals Corporation under the tradenames Pluronic L-62, L-81, and L-121;
2. condensates of ethylene oxide and propylene oxide with glycerine (MW, 6500) commercially available from Exxon Chemical Co., U.S.A.;
3. reaction products of isocyanates and amines (example, toluene 2, 4 di-isocyanate and $\beta$-amine).

For a particular substrate material and resin, simple laboratory tests can be performed to determine suitable surfactants and optimum concentration.

The surfactant will be dissolved or dispersed in the curing bath liquid at a concentration between about 0.2% and about 3% by volume. The bath liquid is immiscible with the liquid resin. Preferred liquid for epoxy resin is a refined paraffinic oil which is aromatic-free and olefin-free. A paraffinic oil that has been successfully used in laboratory experiments is a white oil sold as P-355 by Exxon Chemical Company, U.S.A.

A preferred resin is an epoxy resin which is capable of bonding to a variety of substrate materials and appears to significantly improve the mechanical strength and permeability retention of materials used as propping agents in hydraulic fracturing operations.

This resin has properties which make it particulary useful in the method of the present invention. The low viscosities of the liquid resin and curing agents permit it to be handled easily in the coating step of the process; the ability of the resin to cure within a relatively wide temperature range permits the process to be performed at easily controlled conditions; the excellent adhesive properties of epoxy permit it to be used with most any substrate material; and finally the high strength of the epoxy enhances the load carrying ability of the substrate material as well as prevents particle disintegration.

Epoxy resins are commercially available, prepared from either glycidyl materials such as the ethers produced by the reaction of chlorohydrin with a phenol or alcohol or epoxides such as the product from the reaction of peracetic acid with a linear or cycloaliphatic olefin.

Suitable epoxy resins can be selected from glycidyl ethers made from bisphenol A and epichlorohydrin. These resins are available in liquid form having a typical viscosity of 140 poises, and an epoxide equivalent weight of 190 and molecular weight of 380. Araldite 6005 sold by Ciba-Geigy Corp. has produced particularly good results in the coating process of the present invention as performed in laboratory experiments. Also usable are glycidyl ethers of novolac resins. A novolac-based epoxy resin that has successfully be used to coat sand particles in the laboratory is a liquid epoxy novolac resin manufactured by Ciba-Geigy Corp. and sold under the tradename EPN 1139.

For high viscosity epoxy resins, it may be desirable to use a diluent. Suitable diluents include butyl glycidyl ether, phenyl glycidyl ether, cresyl glycidyl ether, decyl glycidyl ether, vinylcyclohexene dioxide, and 1, 4 butanediol diglycidyl ether. Also usable are acetone, dibutylphthalate and aromatic hydrocarbon oil fractions.

The liquid resin will normally be used with a curing agent which accelerates the transition of the resin from a liquid to a solid state. The curing agent (hardener, activator, or catalyst) may be employed with the liquid resin or in the bath liquid. If the former, the chemicals should be admixed with the particulate material as soon as possible before the curing proceeds to a great extent.

Curing agents for epoxy resins may be selected from a basic group of amines, acids, and acid anhydrydes, fatty oils and acids, phenoplasts, and aminoplasts. Suitable basic curing agents include diethylene triamine, ethylene diamine, triethylene tetramine, dimethylamino propylamine, diethylamino propylamine, piperidine, methane diamine, triethylamine, benzyldiethylene dethylamino phenol, detrimethylaminoethylphenol, $\alpha$ methylbenzyl dimethylamine, metaphenylene diamine, 4,4 methylene dianiline, and mixtures of such amines. Acidic curing agents include oxalic acid, phthalic acid, pyromellitic acid, pyromellitic dianhydride, dodecenyl succinic anhydride. These curing agents may be used in pure form or in suitable solvents. The resin to curing agent ratio (volume) will normally be between 20:1 and 3:1.

The bonding strength between the resin and the substrate material may be improved by the use of coupling agents. A small amount of agent may be added to the liquid resin. A suitable coupling agent for epoxy resin and silica is an organo-functional silane such as 2, aminoethyl-aminopropyl silane.

In carrying out the method of the present invention the particulate material should be cleaned thoroughly to remove foreign matter or oxide deposits. When using sand as the substrate material, a pretreatment with dilute HCl or other acid should be performed to remove iron oxide deposits from the sand surfaces.

The clean particles are placed in a suitable container and from about 2 to 15 weight percent, preferably 5 to 15 weight percent, of the liquid resin including a curing agent and coupling agent (if used) is admixed with the particles. The contents of the container are agitated by rolling or stirring to uniformly coat the particles. On large scale operations, the coating step can be performed in a rotating drum, cement mixer or other commercial mixing equipment. Immediately following this operation, which requires a short time, the particles are slurried with a liquid immiscible with the liquid resin and containing a suitable surfactant for the resin curing step. The liquid may be in a separate container, in which case the particles coated with the liquid or uncured resin are transferred into the container. Or, it may be in the same container in which the coating step was performed, in which case the liquid is introduced into that container. In either situation, however, the coated particles are agitated to prevent agglomeration of the uncured resin. The curing time will depend upon the type and amount of resin, the type of curing agent used, and the temperature at which the cure occurs. For curing sand coated with about 10% by weight of epoxy resin with certain amine curing agents, at 70°F., curing time of about one hour is sufficient to transform the epoxy liquid into a hard, tough coat. The curing time can be controlled by regulating the cure temperature.

After the resin has cured, the cure liquid is decanted or drained off and the coated particles dumped from the container into a storage bin or package. The particles then will normally be washed to remove the cure liquid. A post-cure of the resin-coated particles in an oven may be desirable with some resins to further toughen the coat. This can be performed at a temperature of about 250°F. for several hours.

A particularly advantageous feature of the particles prepared in accordance with the present invention is that they can be handled much in the same manner as other particulate material which exhibit the property of flowability.

The following laboratory experiment illustrates the effectiveness of the present invention in providing high strength, smooth, free-flowing coated particles:

Resin: a liquid epoxy novolac resin (manufactured by Ciba-Geigy Corporation and sold under tradename Araldite 1139)
Curing Agent: metaphenylene diamine
Particles: 8-12 mesh silica sand
Coupling Agent: β 3, 4 epoxycyclohexyl ethyltrimethyoxysilane (manufactured by Union Carbide Chemical Co. and sold under the tradename A-186)
Cure Liquid: White Oil (product of Exxon Chemical Co., U.S.A. sold under tradename P-355)
Surfactant: nonionic, condensates of ethyleneoxide and propyleneoxide with glycerine (product of Exxon Chemical Co., U.S.A., and sold under tradename Antifoam 8560)

The curing agent, liquid epoxy and coupling agent were mixed together to form a composition comprising 91 weight percent resin, 8 weight percent curing agent and one weight percent of the coupling agent.

Five hundred grams of the sand were mixed with 50 grams of the liquid resin composition until the particles were thoroughly coated. The particles coated with the liquid resin were transferred to a bath of white oil containing one volume percent of the surfactant and maintained at 200°F. The particles were stirred with a spatula during the curing step which required about 45 minutes. The particles were removed from the bath liquid, washed, and dried. The coated particles weighed 545 grams, indicating that 90 weight percent of the resin was deposited on the particles. Thus each particle consisted of an average of 92 weight percent substrate and 8 weight percent coating.

During curing, agglomeration or sticking was negligible and the final product was characterized as a free-flowing, well-rounded, hard-shelled particle. The appearance of the particles was shiny and smooth. In fact, there appeared to be less surface irregularities on the coated sand than on the uncoated sand.

Laboratory tests were performed on the coated particles to determine the behavior of the coated particles under stress. The tests consisted of measuring the conductivity of multi-layers of the coated particles at various stress levels. Conductivity is defined as the product of fracture permeability (md) and fracture width (inches).

The test apparatus for determining the conductivity of various samples under stress included a pressure cell for containing the samples, platens for applying a force on the samples, a system for flowing fluid through the cell, and instruments for controlling and measuring the temperature and pressure within the cell. About 165 grams of the selected samples were placed in the cell in a multi-layer pattern and the conductivity for the sample was determined at various stress levels by flowing brine at 150°F. through the packed cell. The equipment and test procedure used in these tests are more fully described in SPE Paper 4117, "Conductivity of Fracture Proppants in Multi-Layers", C. E. Cooke, Jr., published by the Society of Petroleum Engineers of AIME.

The results of the tests for resin-coated sand particles and uncoated particles are presented in Table I.

TABLE I

| | Particle Size Mesh (U.S.S.) | Fracture Conductivity (md-in) | | | |
| --- | --- | --- | --- | --- | --- |
| | | stress 1,000 psi. | stress 3,000 psi. | stress 5,000 psi. | stress 8,000 psi. |
| Epoxy Coated Sand | 8-12 | 492,290 | 293,145 | 140,031 | 44,577 |
| Uncoated Sand | 8-12 | 422,032 | 123,557 | 24,953 | 8,188 |

Based on the above tests, it is apparent that much higher conductivity is obtained with resin-coated particles, particularly at high stress levels. At stresses in the 5,000 to 8,000 psi range, the conductivity of the resin-coated sand was more than 5 times the conductivity of the uncoated sand. The high conductivities are believed to be due to high permeabilities through the particles arranged in the multi-layer pattern.

Additional samples were prepared in the laboratory using the same procedure but with different materials. These experiments were performed on 50 grams of 8/12 mesh sand using 5 grams of a liquid resin comprising 88 weight percent epoxy resin and 12 weight percent curing agent. The curing bath was 100 cc of white oil containing one volume percent surfactant and maintained at 200°F. The surfactants used in the experiments are summarized in Table II.

Of the 16 samples presented in Table II, only the high molecular weight nonionic surfactants (samples 13, 14, 15 and 16) produced coated particles without excessive agglomeration. The molecular weight of the nonionic surfactants used in samples 1 through 9 were below 2000. It is believed that the success with the nonionic surfactants used in samples 13 through 16 was due, in part at least, to the high molecular weight of these surfactants.

The present invention also can be employed to coat fibrous material to protect such material from environmental effects or to increase bonding to a matrix. It has specific application in coating metal fibers used as reinforcement in concrete. These metal fibers are exposed to the water in the cement which tends to corrode them, reducing their effectiveness. Moreover, the metal fibers must be stored in dry containers to prevent them from corroding and sticking together. By coating the fibers with a resin, the particles retain their mechanical strength and are not subjected to the corrosive action of the water or environment. The reinforced material may include steel fibers between about 0.01 inches and .1 in diameter and 0.1 to 1 inch long. The problem of agglomeration here is basically the same as that discussed previously in connection with propping agents. The reinforcing fibers must be coated with a resin and the resin cured with agglomeration. The coating procedure for the metal fibers may be the same as that described above.

The following laboratory experiment describes a specific treatment for steel fibers. Materials used were:
Fibers: 0.010 × 0.22 × 1.0 inch steel fibers (purchased from U.S. Steel Corp.)
Resin: Epoxy (product of Ciba-Geigy Corp., sold under tradename Araldite 6005)
Curing Agent: diethylaminopropylamine
Bath Liquid: White Oil (product of Exxon Chemical Co., U.S.A. sold under the tradename P-355)
Surfactant: nonionic, condensates of ethyleneoxide and propyleneoxide with glycerine (product of Exxon Chemical Co., U.S.A., and sold under tradename Antifoam 8560)

The fibers were heated in an oven (800°F.) for about two hours to clean the surfaces of oil. Ten grams of the fibers were mixed with one gram of a liquid comprising epoxy resin and curing agent. The white oil bath contained one volume percent of the surfactant and was maintained at about 200°F. The coated fibers were placed in a beaker containing the bath liquid and continuously stirred with a spatula during the curing step. The resin cured in about 1½ hours. The coated particles were removed from the bath and washed with a light oil and soap solution. The coated fibers were discrete particles and showed no tendency to stick together. Examination under the microscope revealed the fibers to be thoroughly coated.

In order to demonstrate the effectiveness of the process in the coating of relatively large volume, fifty pounds of sand were coated in a bath treatment using a cement mixer. The materials used were:
Sand: 20–40 mesh silica sand
Resin: a liquid epoxy novolac resin (manufactured by Ciba-Geigy Corp. and sold under tradename Araldite 1139)
Diluent: acetone
Curing Agent: metaphenylene diamine
Coupling Agent: β 3, 4 epoxycyclohexyl ethyltrimethyoxysilane (manufactured by Union Carbide Chemical Co. and sold under the tradename A-186.)
Cure Liquid: White Oil (product of Exxon Chemical Co., U.S.A. and sold under tradename P-355)

TABLE II

| Sample No. | Type | Trade Name | Supplier | Chemical Description | |
|---|---|---|---|---|---|
| 1 | Nonionic | Hallco CPH-31-N | C. P. Hall Company | glyceryl monooleate | |
| 2 | Nonionic | Emulphor EL-620 | GAF Corporation | P.O.E. castor oil (20 moles EtO) | |
| 3 | Nonionic | Emulphor EL-719 | GAF Corporation | P.O.E. castor oil (40 moles EtO) | |
| 4 | Nonionic | TWEEN 85 | Atlas Chemicals | P.O.E. castor oil | |
| 5 | Nonionic | Alrosol O | Ciba-Geigy, Inc. | oleic acid diethanolamide | |
| 6 | Nonionic | Pegosperse 200 ML | Glyco Chemical, Inc. | monolaurate of P.E.G. 200 | |
| 7 | Nonionic | Hallco CPH-43 | C. P. Hall Company | monolaurate of polyethylene glycol 600 | |
| 8 | Nonionic | Pegosperse 400 DL | Glyco Chemicals, Inc. | dilaurate of polyethylene glycol 400 | |
| 9 | Nonionic | Renex 20 | Atlas Chemicals | P.O.E. tall oil (16 mole EtO) | |
| 10 | Cationic | Ethomeen C-12 | Armak Company | P.O.E. of cocoamine (2 EtO) | |
| 11 | Cationic | Isothan DL-1 | Onyx Chemical Co. | dialkyl dimethyl ammonium bromide | |
| 12 | Nonionic | Victamine C | Stauffer Chemical Co. | dodecyl phosphoramide | |
| 13 | Nonionic | Antifoam 8560 | Exxon Chemical Company, U.S.A. | polypropylene glycol (M.W. = 6500) | |
| 14 | Nonionic | Pluronic L-62 | Wyandotte Chemicals | condensates of ethylene oxide with bases formed by condensing propylene oxide with propylene glycol | - MW = 2500 |
| 15 | Nonionic | Pluronic L-81 | Wyandotte Chemicals | '' | - MW = 2750 |
| 16 | Nonionic | Pluronic L-121 | Wyandotte Chemicals | '' | - MW = 4500 |

The liquid resin composition consisted of 2.5 pounds of the liquid epoxy, 0.35 pounds of the curing agent, 20 volume percent of the diluent, and 0.025 pounds of the coupling agent. This composition was heated to 190°F. in the cement mixer. Fifty pounds of the sand was admixed to the liquid epoxy. This mixture, maintained at 190°F. was rolled in the cement mixer until the particles were thoroughly coated. About five gallons of the white oil containing 1% by volume of surfactant was then introduced into the cement mixer for the curing step. The cement mixer continued operating during the curing step which required about 40 minutes at the control temperature of 190°F.

The sand particles coated with hard infusible epoxy were then removed and washed with a detergent in water to remove the bath oil. The final step was to further cure the particles in a dry oven at a temperature of 250°F.

During the coating process, very little particle agglomeration occurred. The final product consisted of coated particles smooth and shiny in appearance.

I claim:
1. A method of forming free-flowing resin-coated particles which comprises:
   a. coating the particles of a particular substrate material with a liquid thermosetting epoxy resin;

b. in the presence of a curing agent capable of curing said epoxy resin to a solid infusible state, agitating said coated particles in a nonpolar liquid immiscible with said liquid resin and containing a nonionic surfactant having a molecular weight of at least 2000 which retards agglomeration of said resin coated particles until said epoxy resin cures to a solid, infusible state; and thereafter c. removing the coated particles from said immiscible liquid.

2. A method as defined in claim 1 wherein said particles are silica sand.

3. A method as defined in claim 1 wherein said particles are metal particles.

4. A method as defined in claim 3 wherein said metal particles are of a ferroalloy.

5. A method as defined in claim 1 wherein said immiscible liquid comprises a hydrocarbon oil substantially free of aromatics and olefins.

6. A method as defined in claim 1 wherein said surfactant is a non-ionic surfactant having a molecular weight between 2000 and 10,000.

7. A method as defined in claim 1 wherein said surfactant is a condensate of ethylene oxide and propylene oxide with glycerine.

8. A method as defined in claim 1 wherein said surfactant is a condensate of ethylene oxide and propylene oxide with propylene glycol.

9. A method as defined in claim 1 wherein said liquid resin contains said curing agent.

10. A method as defined in claim 1 wherein the liquid resin deposited on the particles constitutes from 2 to 15 weight percent of the coated particles.

11. A method as defined in claim 10 wherein said liquid resin contains an organofunctional silane coupling agent.

12. A method as defined in claim 2 wherein said silica sand has a particle size between about 6 and 100 mesh on the U.S. Standard Sieve Series.

13. A method of coating particulate material with a resin to form free-flowing, non-sticky, resin-coated particles which comprises:

a. mixing said particulate material with a liquid thermosetting epoxy resin and a curing agent for said epoxy resin to deposit a coating which substantially covers each particle;

b. curing said coated particles in contact with a nonpolar liquid immiscible with said resin and a minor amount of a nonionic surfactant having a molecular weight of at least 2000 until said resin cures to a hard, infusible state, said surfactant having the ability to retard agglomeration of said resin-coated particles; and thereafter c. removing said bath liquid containing said surfactant.

14. A method as defined in claim 13 wherein sufficient liquid resin is mixed with said particulate material to deposit a resin coating on said particles of between about 5 and about 15 weight percent based on the weight of the coated particles.

15. A method as defined in claim 12 wherein said nonionic surfactant is present in said nonpolar, immiscible liquid in a concentration between about 0.2 and about 3.0 weight percent.

16. A method as defined in claim 15 and further comprising heating said resin-coated particles to temperature sufficient to further cure the resin.

17. A method as defined in claim 1 wherein said curing agent is contained in said nonpolar liquid.

* * * * *